US005487099A

United States Patent [19]
Maekawa

[11] Patent Number: 5,487,099
[45] Date of Patent: Jan. 23, 1996

[54] PORTABLE TELEPHONE HAVING AN ADDITIONAL DEVICE FOR MAKING EXTERNAL CONNECTIONS

[75] Inventor: Hitoshi Maekawa, Amagasaki, Japan

[73] Assignee: Mitsubishi Denki Kabushiki Kaisha, Tokyo, Japan

[21] Appl. No.: 310,056

[22] Filed: Sep. 22, 1994

Related U.S. Application Data

[62] Division of Ser. No. 162,964, Dec. 8, 1993, abandoned.

[30] Foreign Application Priority Data

Jan. 29, 1993 [JP] Japan ..................... 5-013115

[51] Int. Cl.⁶ ..................... H04Q 7/32
[52] U.S. Cl. ..................... 379/59; 320/2; 455/90
[58] Field of Search ..................... 235/441, 486; 319/61; 320/2; 340/310.07, 310.8; 379/51, 58, 59, 63, 93, 98, 357; 455/89, 90, 127, 185.1, 348

[56] References Cited

U.S. PATENT DOCUMENTS

| | | | |
|---|---|---|---|
| 5,136,229 | 8/1992 | Galvin | 320/2 |
| 5,249,218 | 9/1993 | Sainton | 379/59 |
| 5,257,414 | 10/1993 | Trahan et al. | 455/90 |

*Primary Examiner*—Curtis Kuntz
*Assistant Examiner*—William Cumming
*Attorney, Agent, or Firm*—Rothwell, Figg, Ernst & Kurz

[57] ABSTRACT

The present invention relates to a portable telephone, and an object of the present invention is to provide a portable telephone and an additional device for the portable telephone capable of improving the portability of the portable telephone in the case that a power source of the portable telephone is additionally provided and the functionality of the portable telephone is extended. The additional device for the portable telephone main body having a connection function with a telephone line, can be detachably attached to a power source section, and has a power source terminal portion capable of being detachably attached to a power source terminal portion in the power source section. That is, the additional devices for the portable telephone having various functions can be prepared as options, and the selected additional device can be integrally attached to the portable telephone comprising the conventional portable telephone main body and the power source section to improve the portability. The additional devices for the portable telephone can have a power source function, a modem function, an extension function for extending the functionality of the portable telephone main body, or a card receiving mechanism.

4 Claims, 18 Drawing Sheets

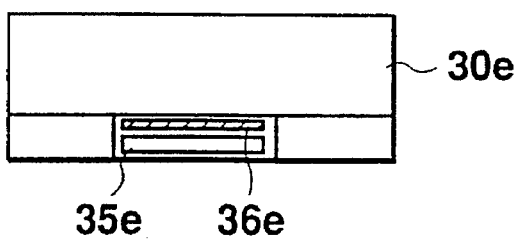
Fig.21a
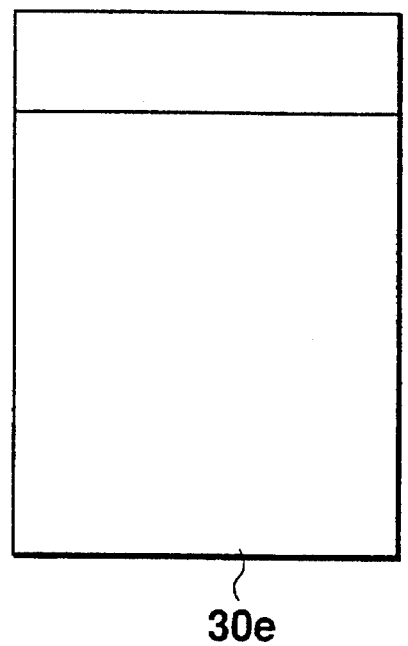
Fig.21d
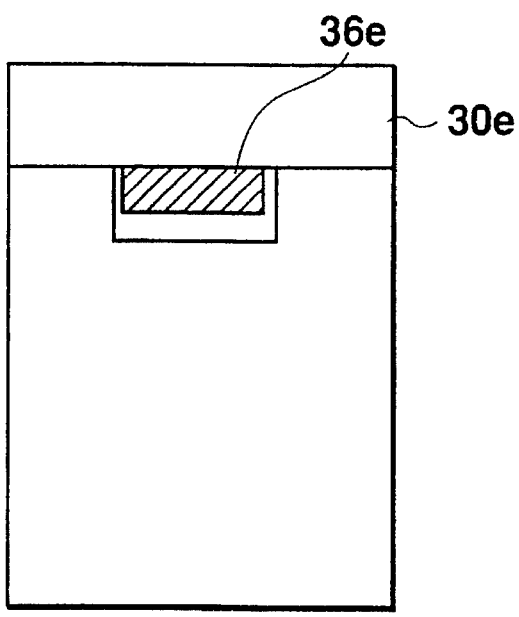
Fig.21b
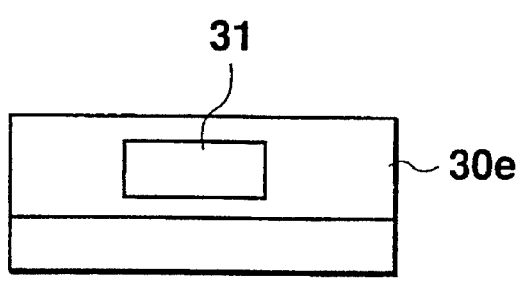
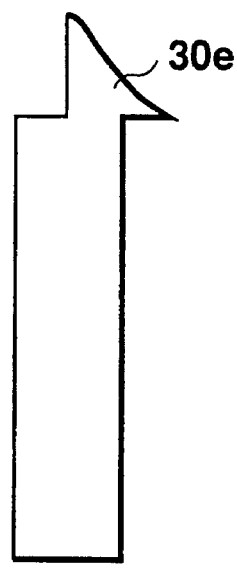
Fig.21c
Fig.21e

PORTABLE TELEPHONE HAVING AN ADDITIONAL DEVICE FOR MAKING EXTERNAL CONNECTIONS

This is a division of application Ser. No. 08/162,964, filed Dec. 8, 1993, now abandoned.

BACKGROUND OF THE INVENTION

1. Field of the Invention

The present invention relates to a portable telephone and an additional device for the portable telephone connected to the portable telephone.

2. Description of the Related Art

A conventional portable telephone P has a portable telephone main body 10 and a battery 20 detachably attached to the portable telephone main body 10, and the portable telephone main body 10 has, on its bottom, a connector 11 for connecting to an external equipment, as shown In FIGS. 1 to 4.

In the portable telephone P having the above-mentioned constitution, the portable telephone main body 10 operates by a power source fed from the battery 20.

However, in the case that a power source is additionally provided In order to prolong a conversation talk time of the portable telephone main body 10, it is necessary to connect an external power source to the connector 11 for external equipment connection disposed in the portable telephone main body 10.

As shown in FIG. 5, in order to connect an external equipment 40 to the portable telephone P having the above-mentioned constitution, a repeater 60 is required between the portable telephone main body 10 and the external equipment 40. That is, for example, in the case that the portable telephone main body 10 in the portable telephone P is connected to the external equipment 40 as a terminal for computer communication to carry out computer communication, an analog or digital signal is fed from the portable telephone main body 10, in case of analog signal, the repeater 60 is required as a modem in order that a signal format may be converted into a digital signal and then fed to the external equipment 40.

That is, in the case that the conventional portable telephone is additionally provided with a power source, connected to the external equipment, or modified to increase functions, the power source or an additional device such as the repeater for increasing the functionality must be connected to the connector 11 for external equipment connection of the portable telephone main body 10. In consequence, such an additional device is not integral with the portable telephone main body 10, so that the portability of the portable telephone P deteriorates.

In addition, Japanese Patent Application Laid-open No. 99093/1992 discloses a radio equipment which is detachably equipped with a battery pack. In this radio equipment, a lug is formed in the vicinity of the lower end of the radio equipment main body, a locking piece and a knob are disposed on the upper side thereof, and a recess for engaging with the lug of the radio equipment main body is formed in the battery pack to facilitate the detachment of the battery.

SUMMARY OF THE INVENTION

An object of the present invention is to provide a portable telephone capable of improving the portability of the portable telephone, in the case that a power source for the portable telephone is additionally provided, an external equipment is connected, or the functionality of the portable telephone is increased.

That is, in an additional equipment for the portable telephone, the additional device for the portable telephone regarding the present invention has a connecting member for detachably and integrally attaching to a portable telephone main body and a connecting member for detachably attaching to a power source section and a power source terminal portion capable of being detachably attached to a power source terminal portion in the power source section. In an portable telephone regarding the present invention, the additional device for the portable telephone can be detachably attached to the portable telephone main body having a connection function with a telephone line, can be integrally attached to the portable telephone main body, can be detachably attached to a power source section, and has a power source terminal portion capable of being detachably attached to a power source terminal portion in the power source section. According to the additional equipment for the portable telephone of the present invention, various functions are provided in this additional equipment for the portable telephone, whereby a device connected as an external device can be integrally mounted on the portable telephone main body to improve the portability.

In short, in the case that the above-mentioned additional equipment for the portable telephone has the power source section, a stand-by time and a conversation talk time can be prolonged, and in the case that the above-mentioned additional equipment for the portable telephone has a modem function, computer communication can be established by connecting to a communication terminal or the like by the use of a connector set. Furthermore, in the case that the above-mentioned additional equipment for the portable telephone has an extension function for extending the functionality of the portable telephone, memory capacity and the like can be extended by attaching the additional equipment for the portable telephone to the portable telephone main body. In addition, in the case that a chip type IC card can be received, the function of the portable telephone main body can be extended in accordance with the information stored in this chip type IC card.

BRIEF DESCRIPTION OF THE DRAWINGS

FIG. 21(a) is a plan view of an additional device for the portable telephone In the fifth embodiment, FIG. 21(b) is its front view, FIG. 21(c) is its base view, FIG. 21(d) is its rear view, and FIG. 21(e) is its right side view.

DESCRIPTION OF THE PREFERRED EMBODIMENTS

Figure 1:
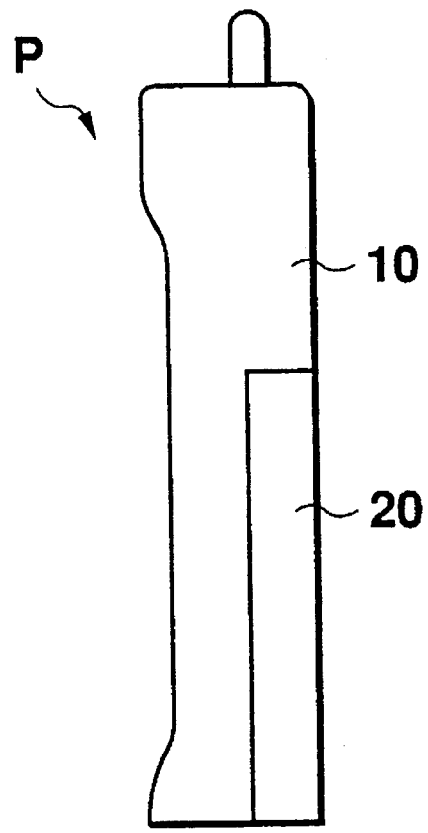
FIG. 1 is a front view illustrating a conventional portable telephone.
Figure 2:
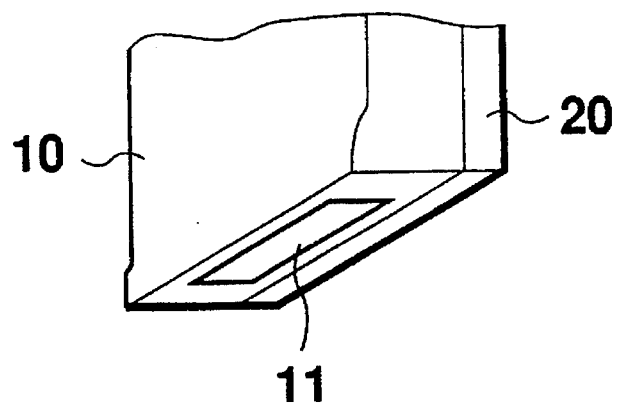
FIG. 2 is an enlarged perspective view of the bottom of the portable telephone shown in FIG. 1.
Figure 3:
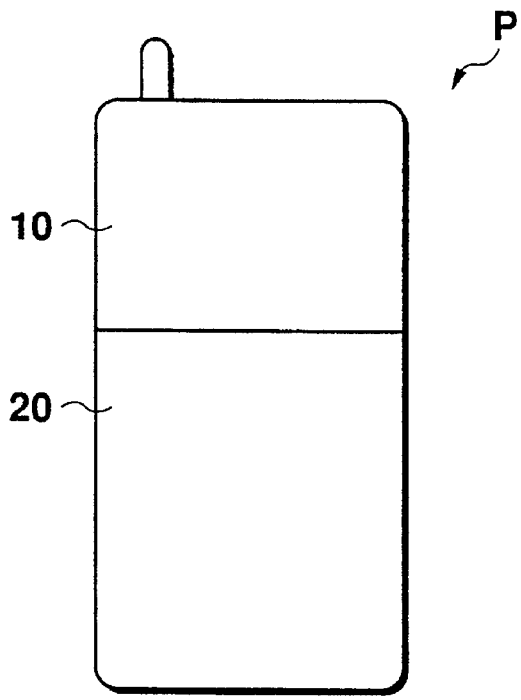
FIG. 3 is a right side view of the portable telephone shown in FIG. 1.
Figure 4:
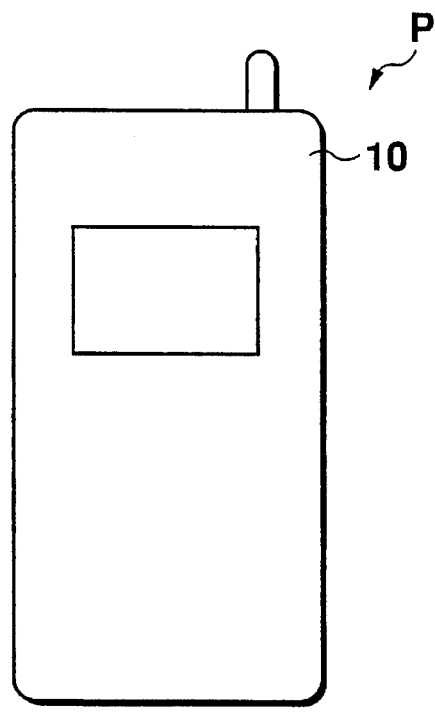
FIG. 4 is a left side view of the portable telephone shown in FIG. 1.
Figure 5:
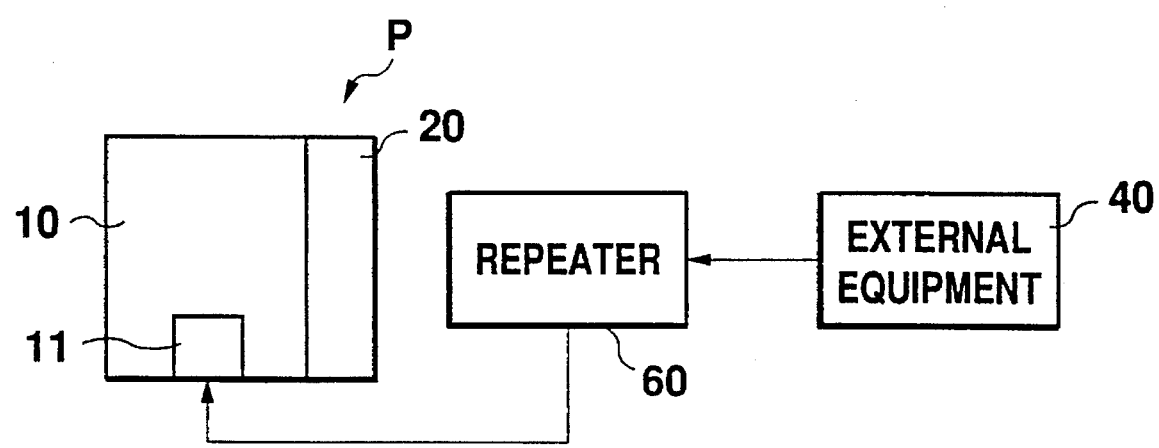
FIG. 5 is an explanatory view illustrating a use state of the conventional portable telephone.

A suitable embodiment of the present invention will be described in reference to drawings. In the drawings, the same members as the above-mentioned conventional members and corresponding portions are represented by the same symbols, and their description will be omitted.

Figure 6:
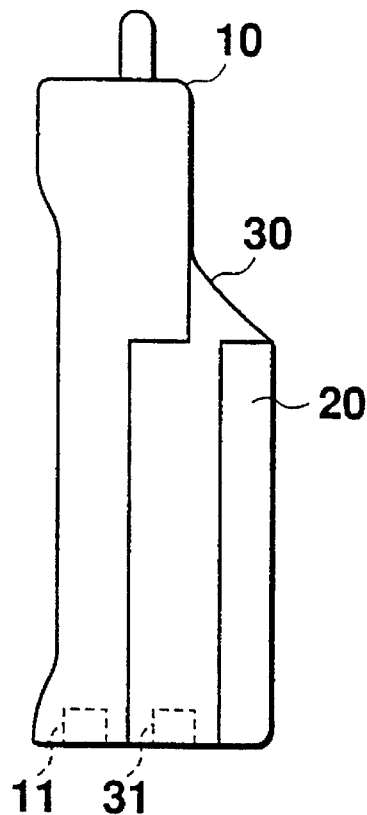
FIG. 6 is a front view of a portable telephone in an embodiment of the present invention.
Figure 7:
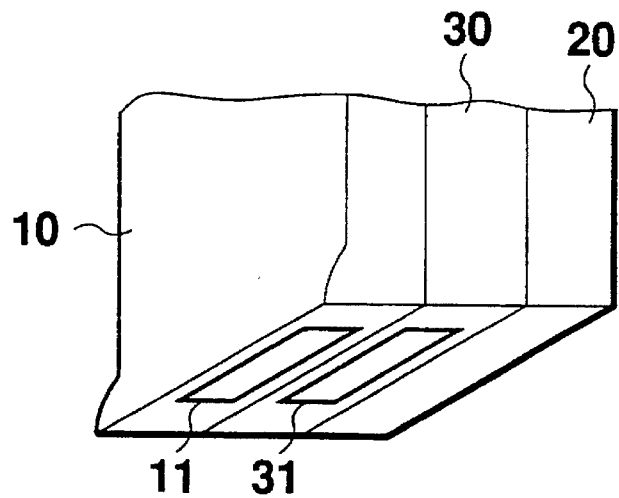
FIG. 7 is an enlarged perspective view of the bottom of the portable telephone shown in FIG. 6.
Figure 8:
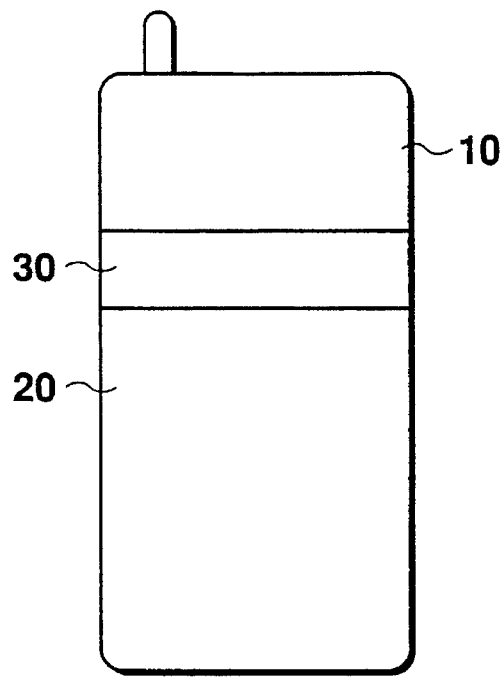
FIG. 8 is a right side view of the portable telephone shown in FIG. 6.
Figure 9:
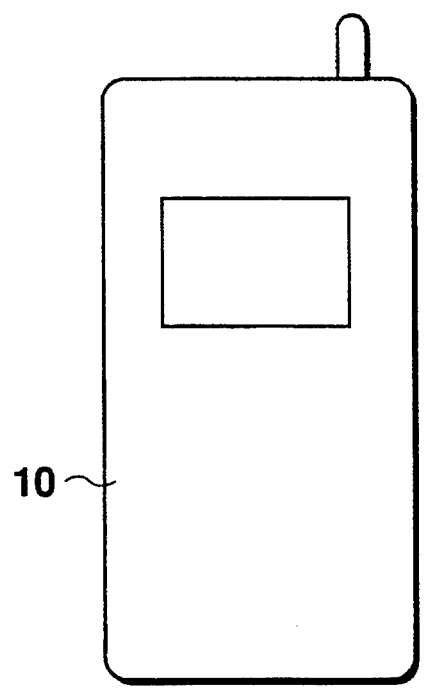
FIG. 9 is a left side view of the portable telephone shown in FIG. 6.

As shown in FIG. 6, a portable telephone in this embodiment comprises a portable telephone main body 10, an additional device 30 for the portable telephone main body connected to the portable telephone main body 10 and detachably attached to the portable telephone main body 10, and a battery 20 connected to the additional device 30 for the portable telephone and detachably attached to the additional device 30 for the portable telephone. Furthermore, as shown in FIGS. 6, 7, 10 and 11, the portable telephone main body 10 has a connector 11 for external connection, and the additional device 30 for the portable telephone also has a connector 31 for external connection. Each of the connector 11 and the connector 31 is constituted of multipolar pins and has a connector for a power source and a connector for input/output of signals. Here, the connector 31 is a connector corresponding to the function of the additional device 30 for the portable telephone. As the above-mentioned additional device 30 for the portable telephone, various types of devices having different functions can be prepared, and the user can select the desirable type, when needed.

Figure 10:
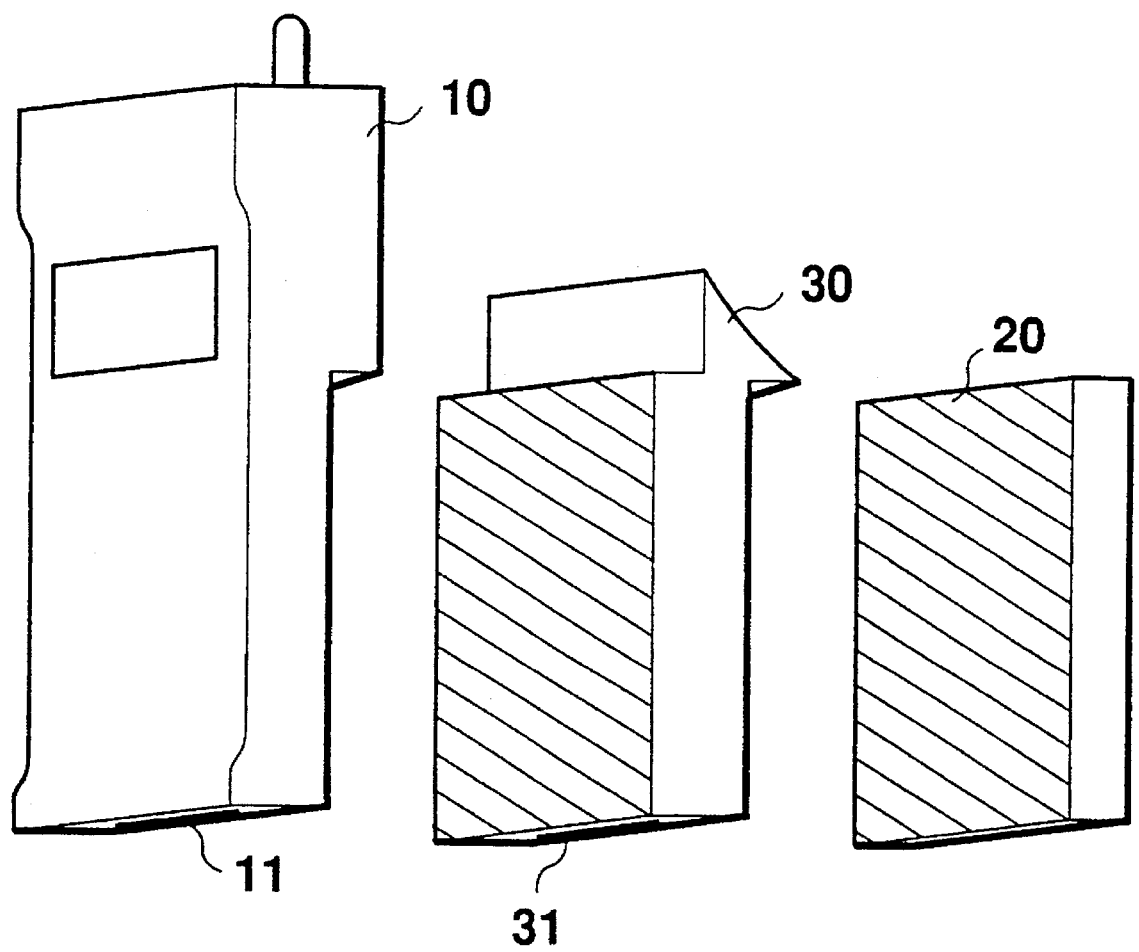
FIG. 10 is an exploded perspective view of the portable telephone.
Figure 11:
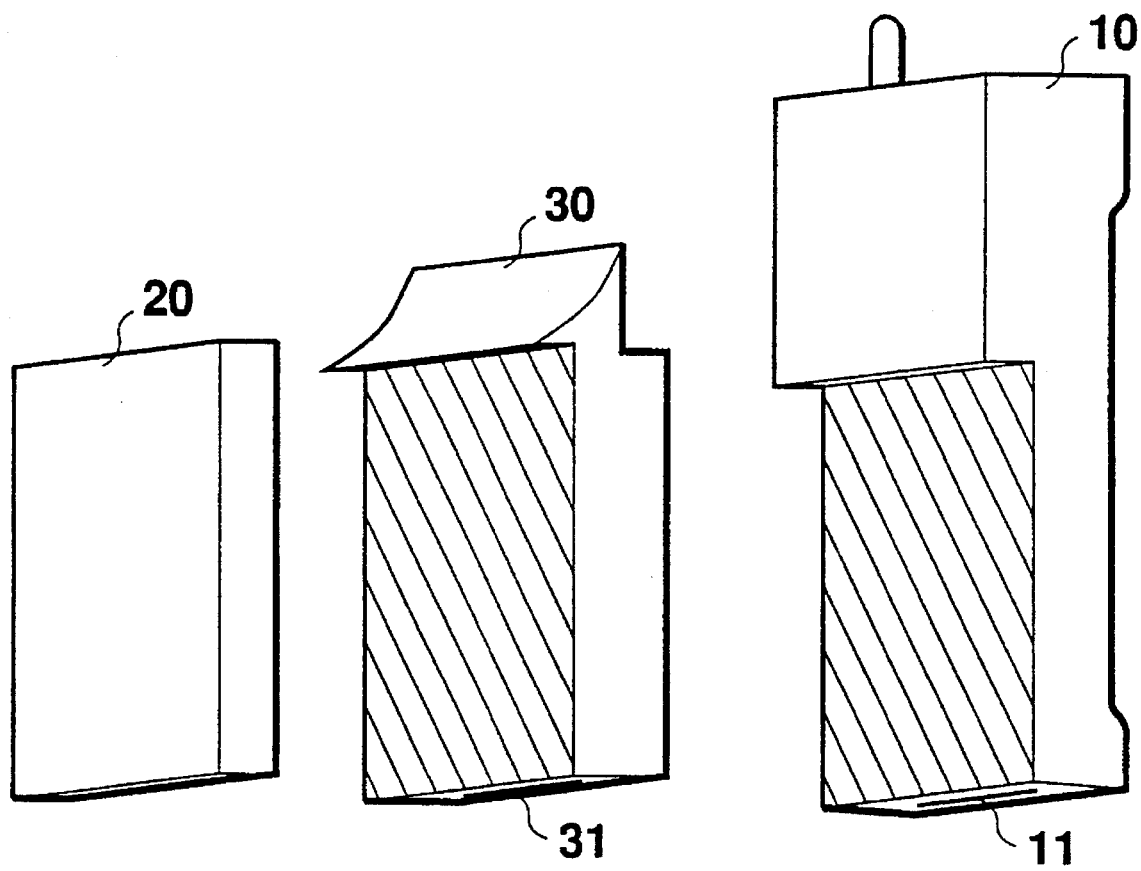
FIG. 11 is an exploded perspective view of the portable telephone.

As described above, the additional device 30 for the portable telephone is detachable from the portable telephone main body 10 and the battery 20 is also detachable from the additional device 30 for the portable telephone, and in addition, the battery 20 is also detachable from the portable telephone main body 10. That is, as shown in FIG. 10, the hatched surface of the additional device 30 for the portable telephone which faces to the portable telephone main body 10 is formed so as to have the same shape and the same size as the hatched surface of the battery 20 which faces to the additional device 30 for the portable telephone. Furthermore, as shown in FIG. 11, the hatched surface of the portable telephone main body 10 which faces to the additional device 30 for the portable telephone is formed so as to have the same shape and the same size as the hatched surface of the additional device 30 for the portable telephone which faces to the battery 20. Thus, the functionality of the portable telephone can be extended by preparing the additional device 30 alone for the portable telephone, because the conventional portable telephone comprising the portable telephone main body 10 and the battery 20 can be utilized, as it is.

Figure 12:
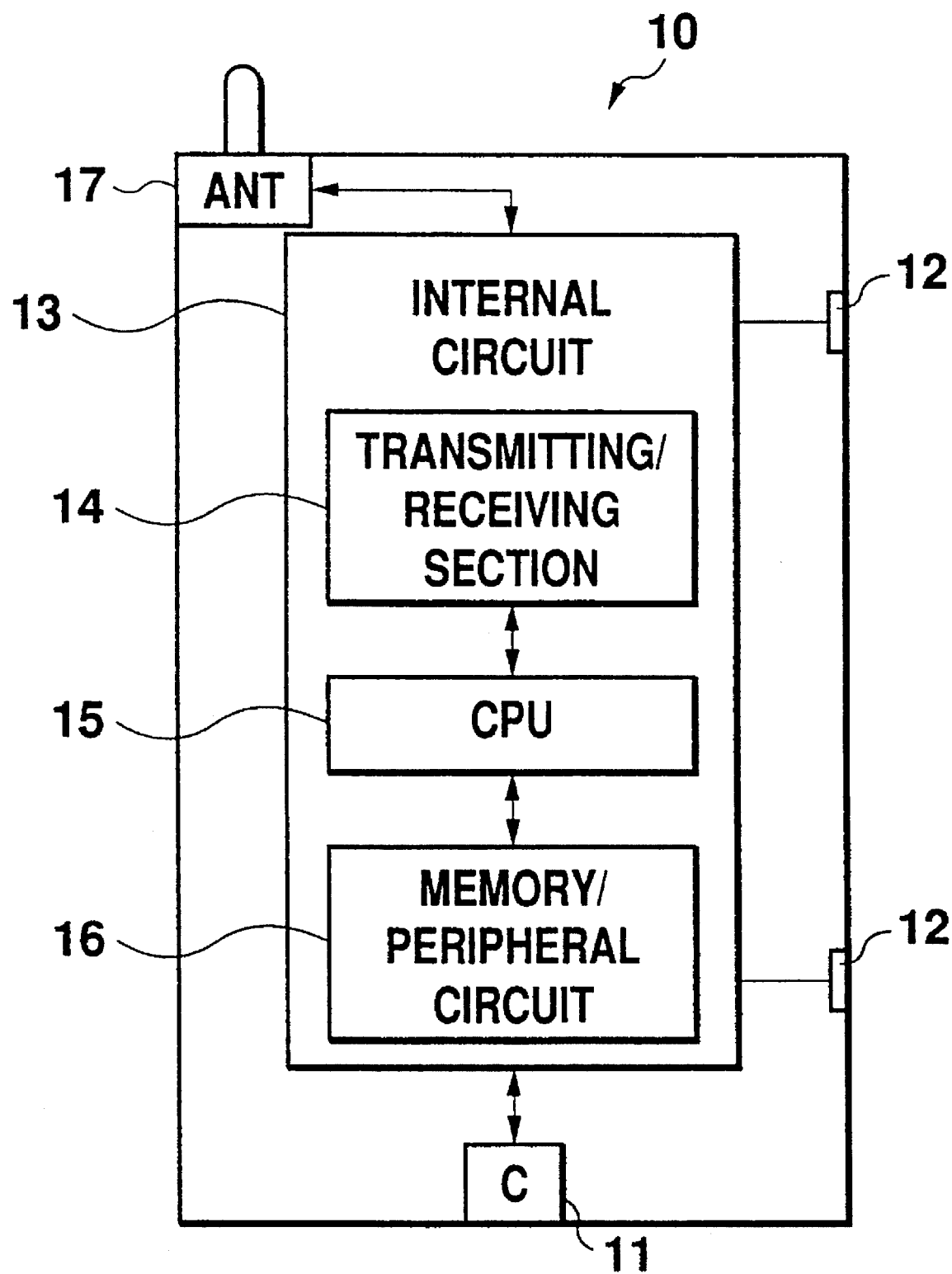
FIG. 12 is a constitutional view illustrating the constitution of the portable telephone main body.

The portable telephone main body 10 has the function of the portable telephone, and as shown in FIG. 12, this portable telephone main body 10 has a connector 11, a battery terminal 12, an internal circuit 13 and an antenna 17. This internal circuit 13 has a transmitting/receiving section 14, a CPU 15 and a memory/peripheral circuit 16.

Various types of additional devices 30 for the portable telephone can be prepared, and they can be optionally exchanged by the user of the portable telephone. Next, some embodiments of the additional devices for the portable telephone will be described.

First Embodiment

Figure 13:
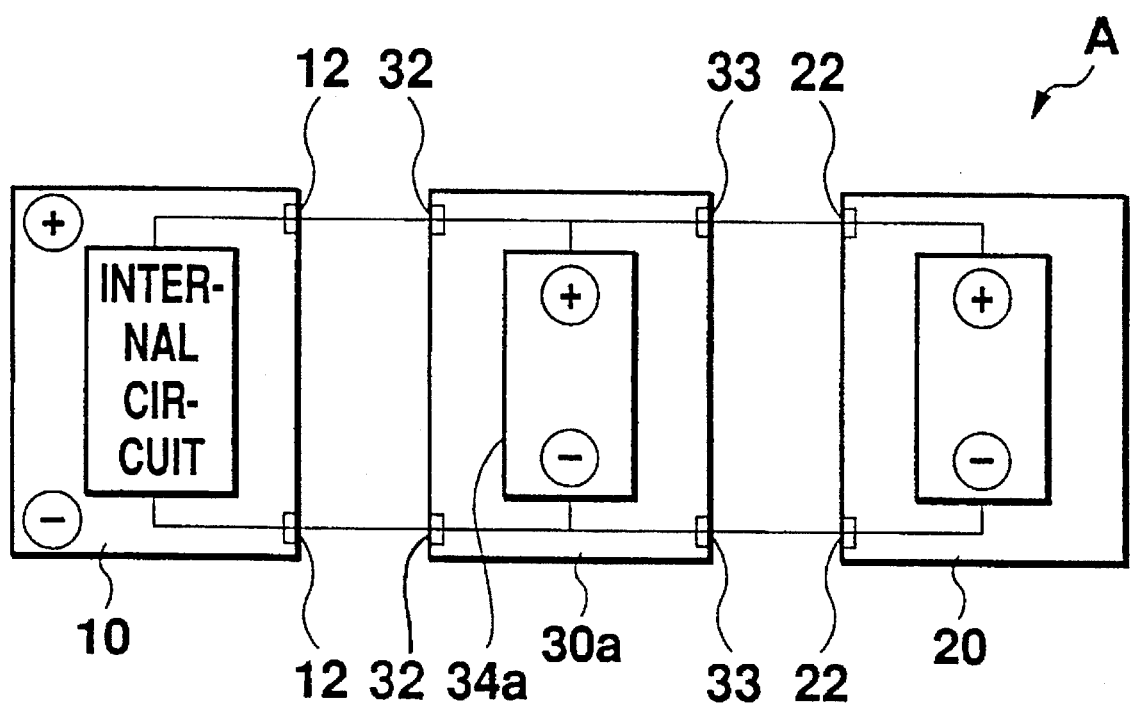
FIG. 13 is a constitutional view illustrating the constitution of an additional device for the portable telephone in the first embodiment.

As the first embodiment, an additional device 30a for the portable telephone having a battery function will be described. That is, the additional device 30a for the portable telephone, as shown in FIG. 13, has a power source section 34a, a battery terminal 32 for connecting to the portable telephone main body 10, and a battery terminal 33 for connecting to the battery 20. Not only the power source section 34a of this additional device 30a for the portable telephone but also the battery 20 are electrically chargeable. The battery terminal 32 for connecting to the portable telephone main body 10 in the additional device 30a is formed so as to have the same shape as a battery terminal 22 disposed on the battery 20, and the battery terminal 33 for connecting to the battery 20 is formed so as to have the same shape as the battery terminal 12 provided in the portable telephone main body 10. In addition, the mutually faced terminals are symmetrically formed. An electric current is provided to an internal circuit showed in FIG. 13 through the battery terminal 12, 32, 33, 22. Also the portable telephone main body 10 and the additional device 30a can be detachably attached to each other by the battery terminal 12 and the battery terminal 32. The additional device 30a and the battery 20 can be detachably attached to each other by the battery terminal 33 and the battery terminal 22. It is possible to connect the respective parts to each other by connecting members other than the battery terminal 12, 32, 33, 22. Moreover, the shape and the constitution of the additional device 30a are the same as shown in FIGS. 6 to 11.

The installation of the additional device 30a for the portable telephone permits prolonging a stand-by time and a conversation talk time which have been short in the case of using the battery 20 alone. That is, this principle is equal to the parallel connection of dry cells, whereby a telephone use time can be prolonged.

Second Embodiment

Next, the second embodiment will be described. In the above-mentioned first embodiment, the additional device 30a for the portable telephone having the battery function has been described, but in the second embodiment, the additional device 30b for the portable telephone is equipped with a modem function which is required for computer communication or the like.

Figure 14:
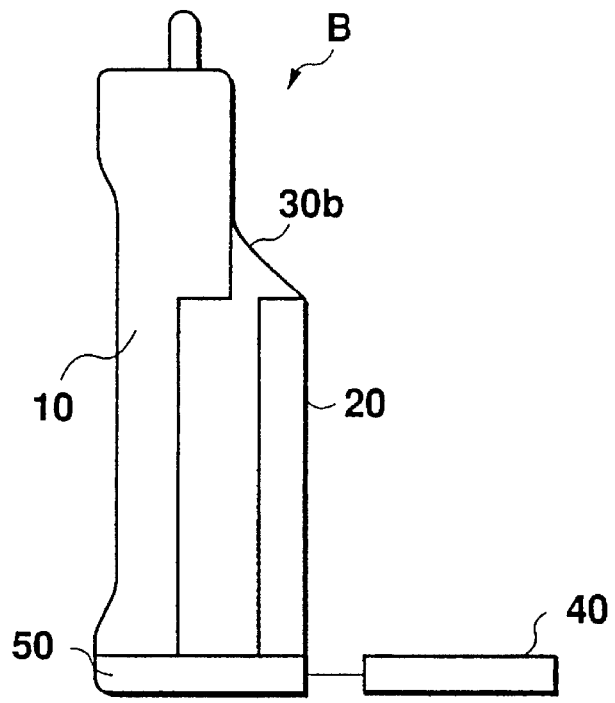
FIG. 14 is a front view illustrating a use state of the portable telephone utilizing an additional device for the portable telephone in the second embodiment.
Figure 15A:
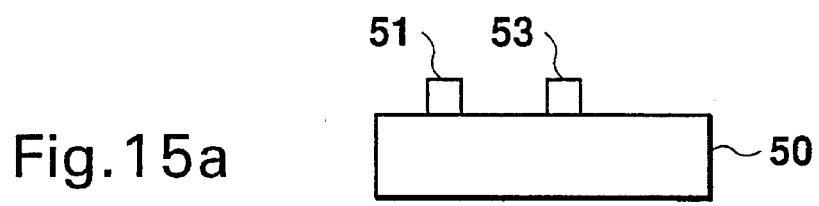
FIG. 15(a) is a front view of a connector set.
Figure 15B:
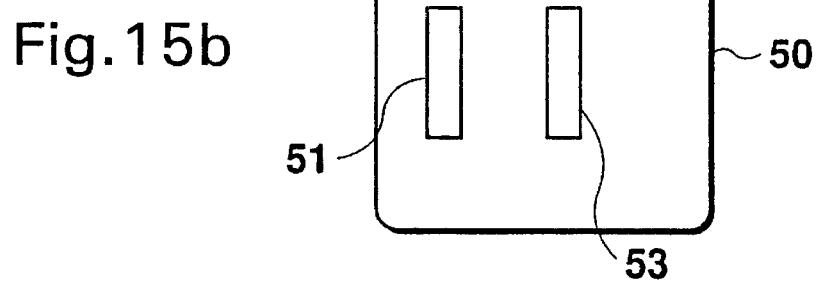
FIG. 15(b) is a plan view of the connector set.
Figure 15C:
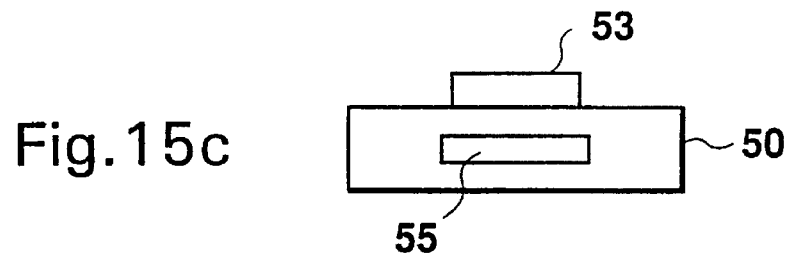
FIG. 15(c) is a right side view of the connector set.
Figure 16:
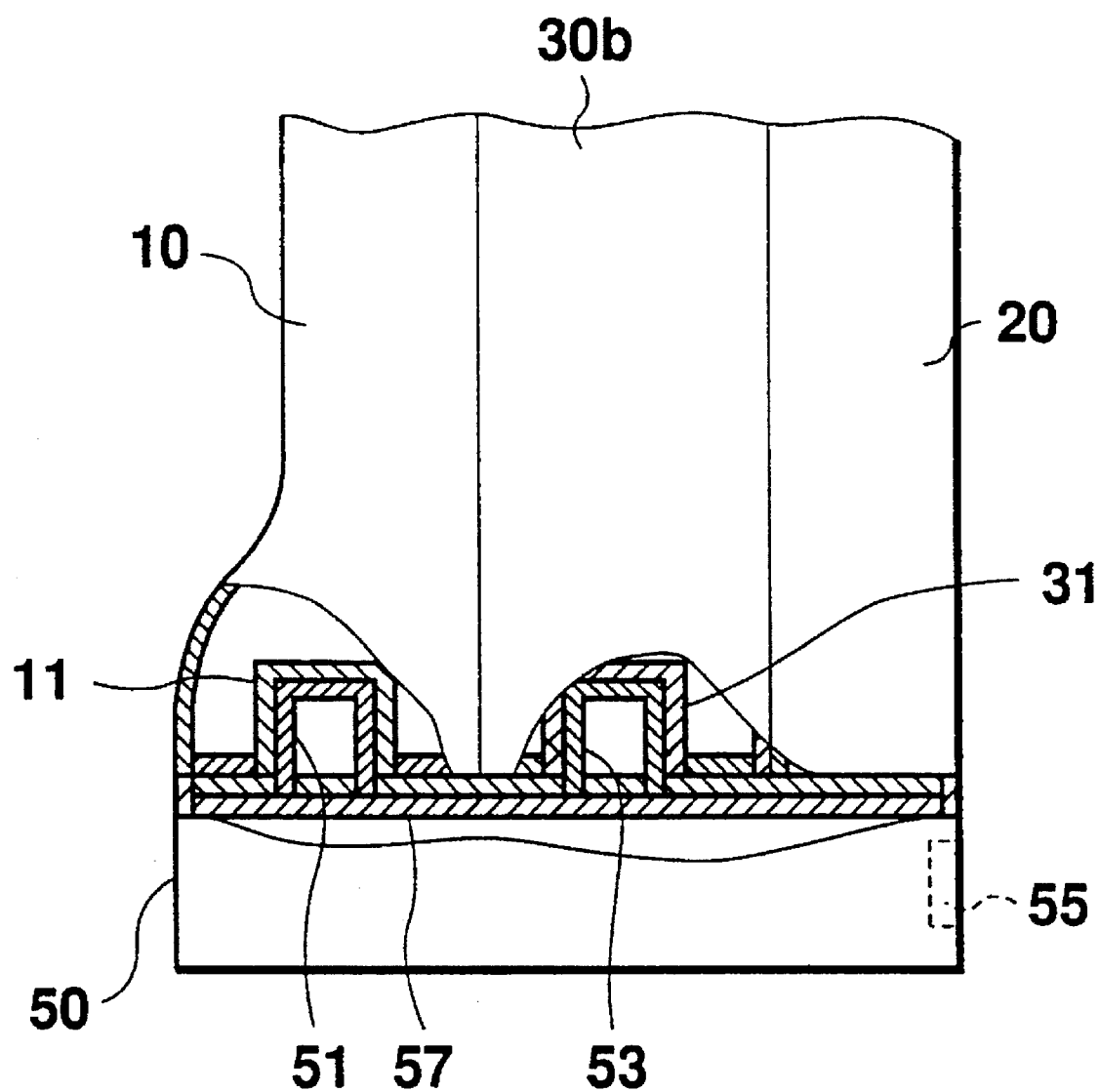
FIG. 16 is a partially broken sectional view illustrating a connection state between the connector set and other members.

That is, a portable telephone B, as shown in FIG. 14, comprises the portable telephone main body 10, the additional device 30b for the portable telephone, the battery 20 and a connector set 50. The shape of the portable telephone main body 10, the additional device 30b and the battery 20 is the same as shown in FIGS. 6 to 11. The connector set 50 has a connector 51 for connection to the portable telephone main body 10, a connector 53 for connection to the additional device 30b for the portable telephone, and a connector 55 for connection to an external equipment 40, as shown in FIG. 16. The connectors 51, 53 are arranged on a substrate 57 disposed in the connector set 50. Each of these connectors 51, 53, 55 comprises multipolar pins. The connector 51 is detachably engaged with the connector 11 of the portable telephone main body 10, and the connector 53 is detachably engaged with the connector 31 of the additional device 30b for the portable telephone. As described above, the portable telephone main body 10 and the additional device 30b for the portable telephone are connected to the connector set 50, and therefore fixation therebetween can be strengthened. In this case, the external equipment 40 is, for example, a communication terminal for computer communication.

Figure 17:
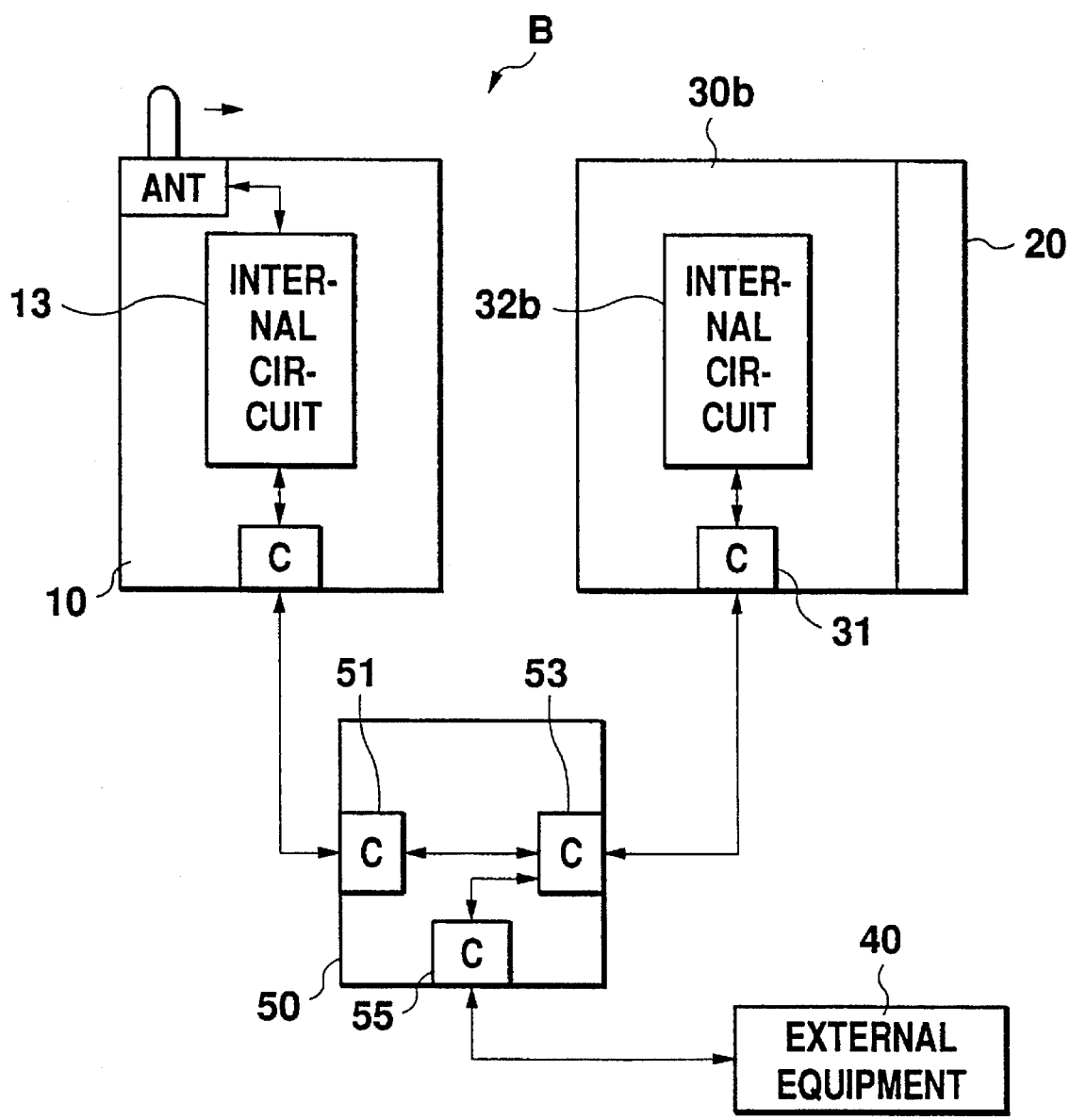
FIG. 17 is a constitutional view illustrating the constitution of the portable telephone in the second embodiment.

Next, the usage of the portable telephone B regarding the second embodiment will be described. As shown in FIG. 17, the portable telephone main body 10 is electrically connected to the additional device 30b for the portable telephone having a modem function via the connector set 50. That is, a signal from the external equipment 40 as the communication terminal connected to the connector set 50 is transmitted to an internal circuit 32b via the connector 55, the connector 53 and the connector 31 of the additional device 30b for the portable telephone, and in this internal circuit 32b, the signal from the external equipment 40 is processed. That is, the digital signal from the external equipment 40 is converted into an analog signal. This analog signal is transmitted to the portable telephone main body 10 via the connector 31, the connector 53 of the connector set 50, the connector 51 and the connector 11 of the portable telephone main body 10. The portable telephone main body 10 connects the input signal to a telephone network, thereby carrying out computer communication. That is, the CPU 15 in the internal circuit 13 processes the signal so as to be suitable for the portable telephone, for example, converts the signal into a digital signal, and the transmitting/receiving section 14 then transmits the signal via the antenna 17. Incidentally, the reception of the signal can be carried out by a procedure completely opposite to that of the signal transmission.

In the above-mentioned second embodiment, the power source is fed from the battery 20 connected to the additional device 30b for the portable telephone, but the external equipment 40 as well as an external power source 45 may be connected to the connector 55 of the connector set 50.

Figure 18A:
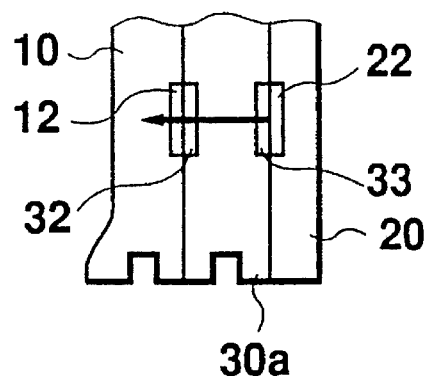
FIG. 18(a) is an explanatory view illustrating a power source feed direction in the case of the first embodiment.

Now, the connection of the battery 20 to other equipments will be described. In the portable telephone A of the first embodiment, the portable telephone main body 10 is connected to the additional device 30a for the portable telephone and the battery 20 as shown in FIG. 12, and thus the power source of the battery 20 can be fed to the portable telephone main body 10 via the additional device 30a for the portable telephone, as shown by an arrow in FIG. 18(a).

Figure 18B:
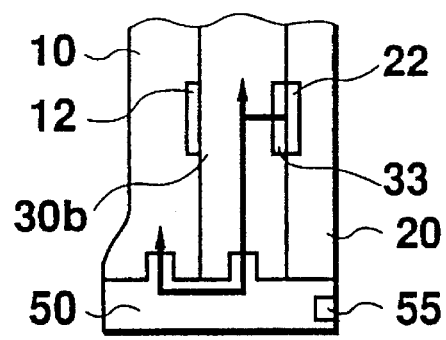
FIG. 18(b) is an explanatory view illustrating a power source feed direction in the case that a power source is fed from a battery in the second embodiment.

Furthermore, in the above-mentioned second embodiment, the feed of the power source from the battery 20 to the additional device 30b for the portable telephone is carried out via the battery terminals 22, 33, as shown in FIG. 18(b), and the feed of the power source to the portable telephone main body 10 is carried out via the connector set 50. That is, the power source is fed from the additional device 30b for the portable telephone to the portable telephone main body 10 via the connectors 53, 51.

Figure 18C:
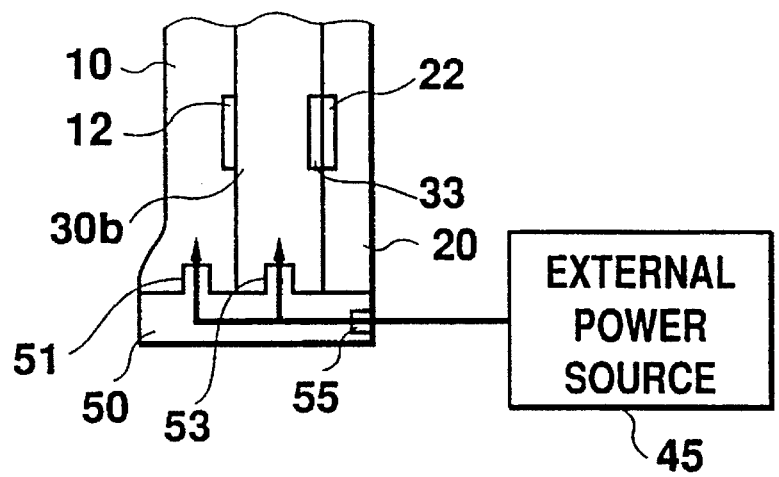
FIG. 18(c) is an explanatory view illustrating a power source feed direction in the case that a power source is fed from an external power source in the second embodiment.
Figure 19:
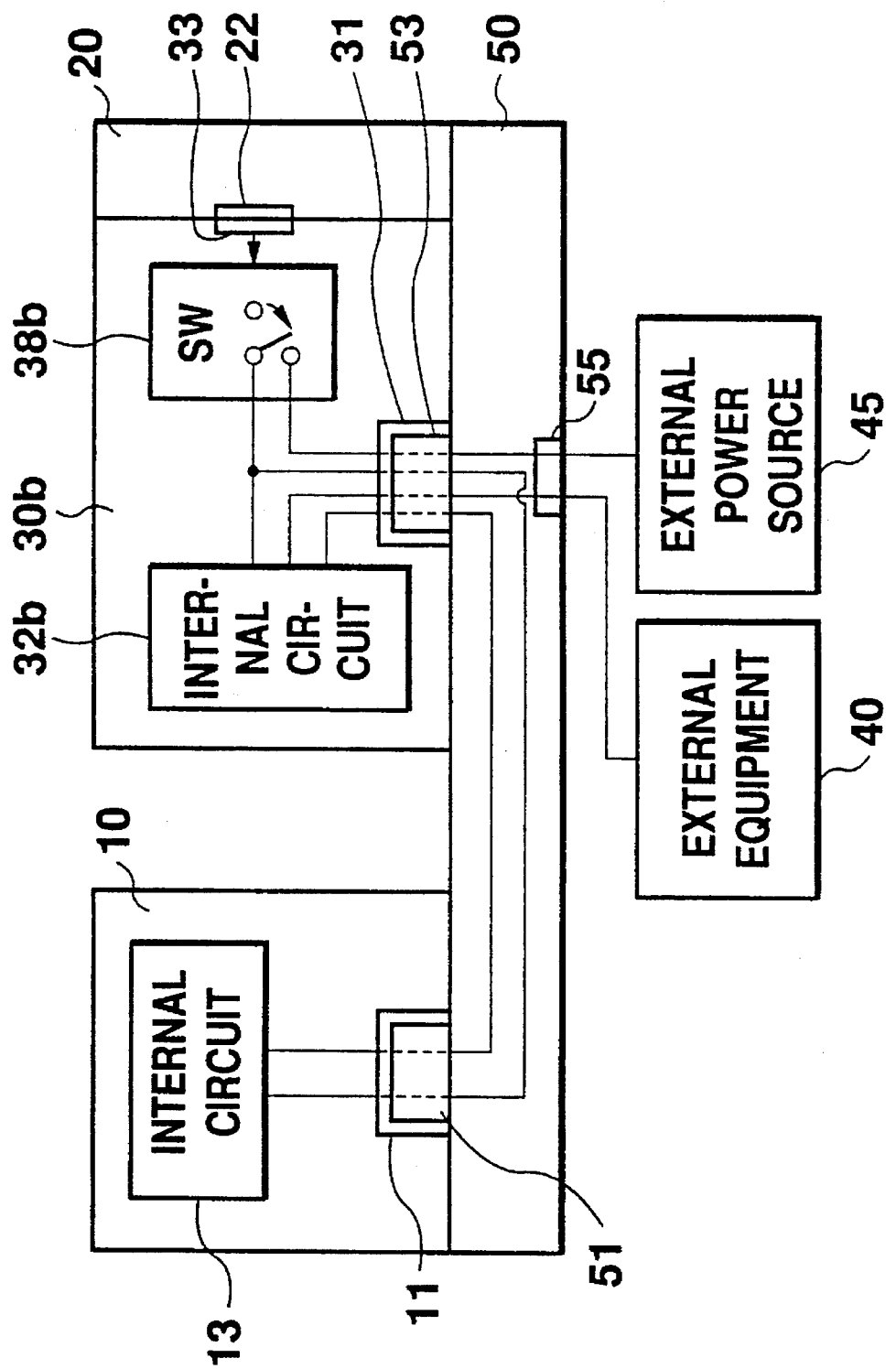
FIG. 19 is a constitutional view illustrating the constitution in which the external power source is connected in the second embodiment.

Moreover, in the case that the power source is fed from the external power source 45, the power source is fed to the portable telephone main body 10 and the additional device 30b for the portable telephone via the connector 55 of the connector set 50 and the connectors 51, 53, respectively, as shown in FIG. 18(c). That is, the system equipped with the external power source 45 will be described in more detail. As shown in FIG. 19, the connector set 50 is connected to the additional device 30b for the portable telephone, and in this case, a switch 38b disconnects the power source feed line extending to the battery 20 by the operation of the internal circuit and connects a line extending to the external power source 45, so that the feed of the power source to the additional device 30b for the portable telephone can be achieved by feeding the power source to the internal circuit 32b via the connectors 55, 53 and the switch 38b. The feed of the power source to the portable telephone main body 10 is achieved by feeding the power source to the internal circuit 13 via the connectors 53, 51. In the case that the external power source 45 is connected, the external equipment 40 is also connected to the connector set 50 via the connector 55, and the signal from the external equipment 40 is processed in the internal circuit 32b, as in the case of FIG. 17. Afterward, the processed signal is transmitted to the internal circuit 13 of the portable telephone main body 10.

As described above, when the additional device 30b for the portable telephone has the modem function, data can be transferred between distantly separated computers, and when the external power source 45 is provided, the data transfer is possible for a long period of time.

Third Embodiment

Next, a portable telephone C of the third embodiment has about the same constitution as in the second embodiment except that a communication terminal which is the external equipment 40 in the second embodiment is replaced with a device having a facsimile function which is the external equipment 40. In this case, the additional device 30b for the portable telephone has a function for sending/receiving data between the external equipment 40 as the facsimile and the portable telephone main body 10. The usual facsimile has a modem therein, and therefore FAX communication is carried out by directly connecting the facsimile to the connector 11 of the portable telephone main body 10.

Next, the fourth embodiment will be described. In the above-mentioned first to third embodiments, the additional device 30a or 30b for the portable telephone has the battery function, the analog/digital terminal, or the multimedia function. However, this fourth embodiment has an extension function for extending the function of the portable telephone main body.

Fourth Embodiment

Figure 20:
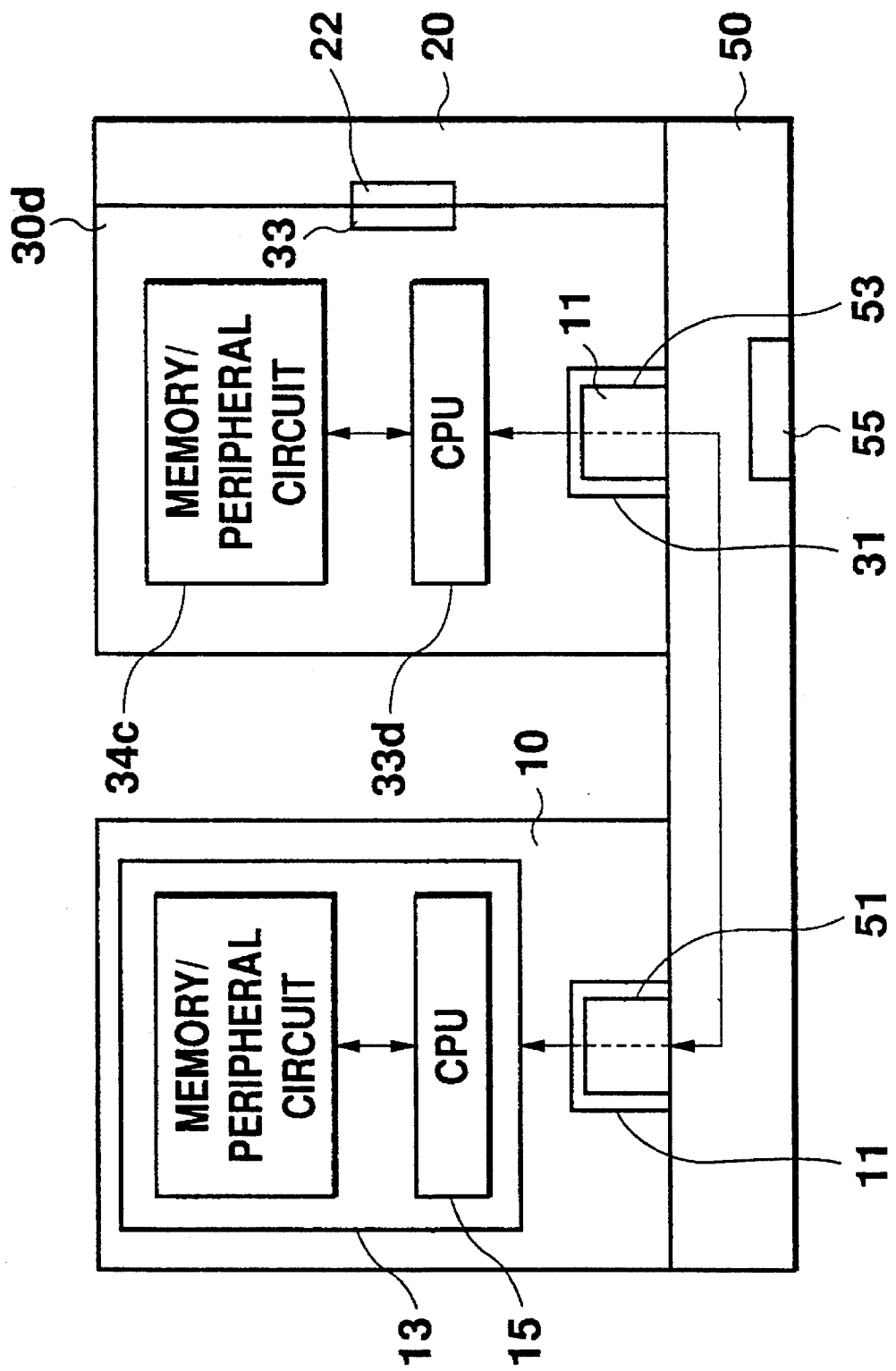
FIG. 20 is a constitutional view illustrating the constitution of the fourth embodiment.
Figure 22:
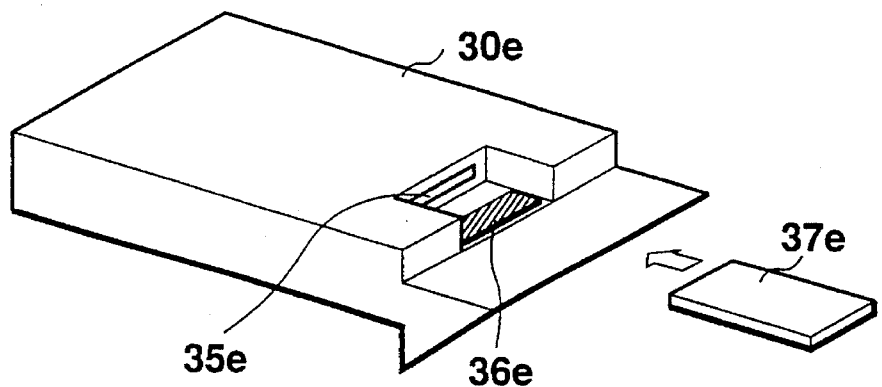
FIG. 22 is a perspective view illustrating the additional device for the portable telephone and a chip type IC card in the fifth embodiment.
Figure 23:
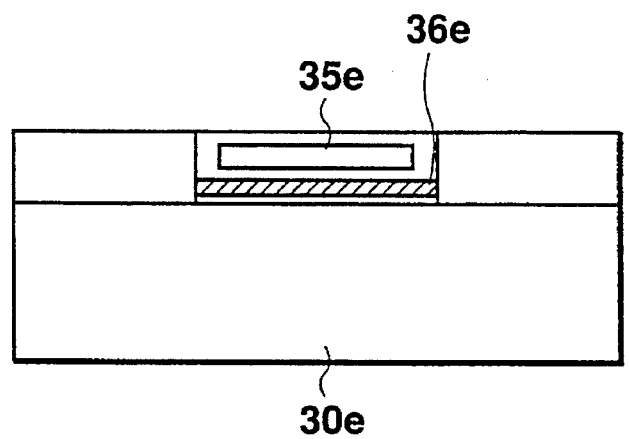
FIG. 23 is a plan view of the additional device for the portable telephone in the fifth embodiment.
Figure 24:
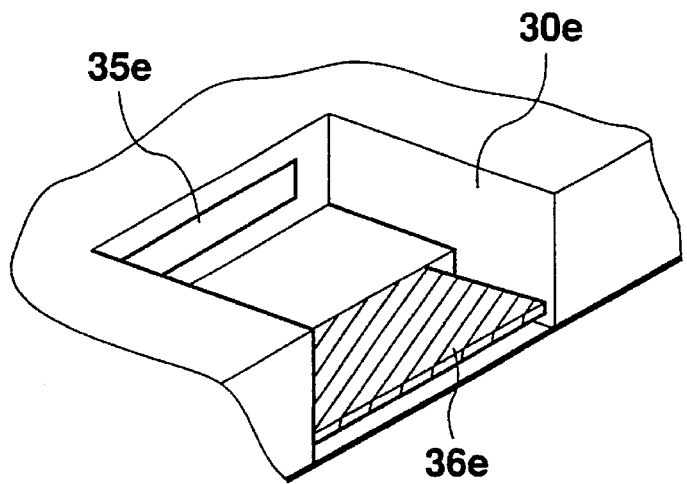
FIG. 24 is a partially enlarged view of the additional device in FIG. 22.

In a portable telephone D of the fourth embodiment, the constitution of the portable telephone main body 10 and the battery 20 is the same as shown in FIGS. 6 to 11, and the constitution of the connector set 50 is the same as in the second embodiment. However, an additional device 30d for the portable telephone has a CPU 33d and a memory/peripheral circuit 34d, as shown in FIG. 20. The CPU 15 in the internal circuit 13 in the portable telephone main body 10 is connected to the CPU 33d by serial communication, and sending/receiving of data can be carried out between both the CPUs. As described above, the additional installation of the CPU 33d and the memory/peripheral circuit 34d permits extending the function of the portable telephone main body 10. That is, according to the fourth embodiment, a memory capacity can be increased, the function of conversation recording and absence-during-recording can be extended, and such various functions as in a portable telephone can be provided.

Fifth Embodiment

Next, the fifth embodiment of the present invention will be described. A portable telephone E regarding this fifth embodiment also has a mechanism for extending the functionality of the portable telephone, as in the above-mentioned fourth embodiment.

That is, the additional device 30e for the portable telephone functions as a chip type IC card receiving device, and as shown in FIGS. 21 to 24, the additional device 30e for the portable telephone has a card gate 35e into which a chip type IC card 37e is inserted. Hence, the chip type IC card 37e can be completely arranged in the additional device 30e for the portable telephone through this card gate 35e. Furthermore, the additional device 30e for the portable telephone has a card ejection switch 36e, and when this card ejection switch 36e is pushed, the chip type IC card 37e can be ejected by a soft-based or a hard-based drive.

Moreover, the additional device 30e for the portable telephone has the connector 31, battery terminal 33, a CPU 33e, a peripheral circuit 34e and a card interface circuit 38e therein, as in the above-mentioned embodiment. In this connection, the constitution of the portable telephone main body 10 and the battery 20 is the same as in the case of the embodiments shown in FIGS. 6 to 11.

Figure 25:
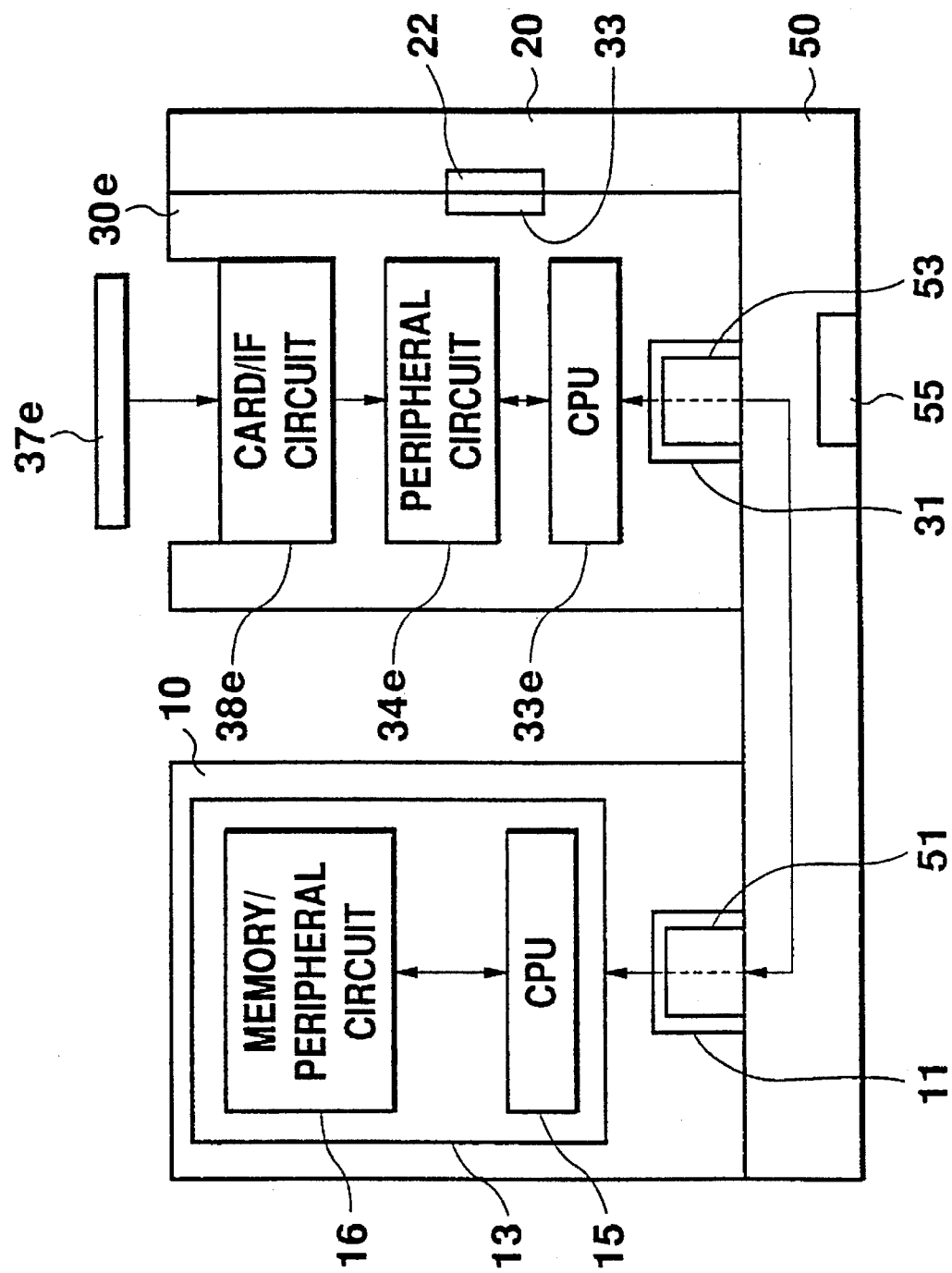
FIG. 25 is a constitutional view illustrating the constitution of the portable telephone in the fifth embodiment.

The usage of the additional device 30e for the portable telephone in this embodiment will be described. The reading of the information in the chip type IC card 37e and the predetermined processing of a signal are carried out by the card interface circuit 38e, the peripheral circuit 34e and the CPU 33e, and an information signal is sent to the internal circuit 13 in the portable telephone main body 10, as shown in FIG. 25. In this way, the function of the portable telephone main body 10 can be extended in accordance with the information in the chip type IC card 37e. For example, a function such as the increase of memory capacity for telephone numbers by abbreviated dialing can be extended. That is, the function of the portable telephone main body 10 can be extended or changed by simply preparing some kinds of chip type IC cards 37e and selecting a desirable one from the prepared cards.

What is claimed is:

1. A portable telephone comprising:

a portable telephone main body having a wireless communication function and means for connecting the telephone main body to a telephone line;

a battery pack for supplying power to said telephone main body; and an additional device detachably connected between said battery pack and said telephone main body, said additional device comprising:

a connector for making external connections; first connecting means for detachably connecting said additional device to said portable telephone main body;

second connecting meads for detachably connecting said battery pack to said additional device with said additional device being interposed between said battery pack and said telephone main body;

means for interconnecting to said portable telephone main body through said first connecting means a signal supplied to said connector from equipment external to said portable telephone main body while connecting electric power from said battery pack to said portable telephone main body through said first and second connecting means; and means functioning to store electric power in an additional battery located within said additional device and to supply the power stored in said additional battery to Said portable telephone main body.

2. A portable telephone according to claim 1, wherein said additional device includes means functioning as a modem for modulating and demodulating said signal.

3. A portable telephone according to claim 1, wherein said additional device includes a CPU and a memory located within said additional device and means functioning to store said signal as data in said memory and to process said signal in said CPU.

4. A portable telephone according to claim 1, wherein said additional device includes means functioning to receive an integrated circuit chip card and for processing said signal as information stored in said chip card.

* * * * *

UNITED STATES PATENT AND TRADEMARK OFFICE
CERTIFICATE OF CORRECTION

PATENT NO. : 5,487,099
DATED : January 23, 1996
INVENTOR(S) : Hitoshi Maekawa

It is certified that error appears in the above-indentified patent and that said Letters Patent is hereby corrected as shown below:

Col. 1, line 25, "In" should be -- in --;
In the Claims: Col. 8, line 45 (claim 1), "Said" should be -- said --.

Signed and Sealed this

Fifth Day of November, 1996

Attest:

BRUCE LEHMAN

Attesting Officer     Commissioner of Patents and Trademarks